US008494575B2

(12) United States Patent
Foley et al.

(10) Patent No.: US 8,494,575 B2
(45) Date of Patent: Jul. 23, 2013

(54) METHODS AND COMMUNICATION DEVICES CONFIGURABLE FOR SILENCE MODE AND EXCEPTIONS TO THE SILENCE MODE

(75) Inventors: Sheila A. Foley, Naperville, IL (US); Michiel S. Knoppert, Chicago, IL (US); Ryan A. Powell, Seattle, WA (US)

(73) Assignee: Motorola Mobility LLC, Libertyville, IL (US)

( * ) Notice: Subject to any disclaimer, the term of this patent is extended or adjusted under 35 U.S.C. 154(b) by 267 days.

(21) Appl. No.: 12/645,928

(22) Filed: Dec. 23, 2009

(65) Prior Publication Data

US 2011/0151851 A1    Jun. 23, 2011

(51) Int. Cl.
*H04M 1/00*         (2006.01)
(52) U.S. Cl.
USPC ............... 455/550.1; 455/418; 455/412.2
(58) Field of Classification Search
USPC .................... 455/550.1, 418, 412.2
See application file for complete search history.

(56) References Cited

U.S. PATENT DOCUMENTS

| 2002/0009192 A1 | 1/2002 | Nakamura |
| 2006/0121887 A1* | 6/2006 | Chilukoor ................. 455/412.2 |

FOREIGN PATENT DOCUMENTS

| JP | 2009159527 | 7/2009 |
| KR | 1020090011154 A | 2/2009 |
| WO | 03077505 A2 | 9/2003 |
| WO | 2008025474 A1 | 3/2008 |

OTHER PUBLICATIONS

Anonym: "Bedienungsanleitun fur das Nokia 6060 Mobiltelefon", Nokia, 2005, pp. 1-115, Retrieved from the Internet: URL: http://nds1.nokia.com/phones/files/guides/Nokia_6060-UG_de.pdf [retrieved on Jun. 21, 2011], all pages.
Patent Cooperation Treaty, International Search Report and Written Opinion of the International Searching Authority for International Application No. PCT/US2010/058484, Jul. 28, 2011, 20 pages.
Motorola: Advisor Elite, User's Guide, 1997, by Motorola, Inc. Paging Products Group, Boynton Beach, FL, printed in USA Sep. 1997, all pages.

\* cited by examiner

*Primary Examiner* — Danh Le
(74) *Attorney, Agent, or Firm* — Gary J. Cunningham

(57) ABSTRACT

The disclosed are methods and communication devices include a user interface configured receive input to place the device in silence mode and to make exceptions to the silence mode and an indicator to provide an announcement that there is data stored related to incoming communications so that even when the device in silence mode, the user may not miss important notifications. The exceptions to the silence mode include at least one of receipt of an identified communication signal, an identified application indication or an identified event notification. The disclosed methods and communication device may further include a sensor to that the processor will provide an indication whether there is data stored related to detect a user action with respect to the device so incoming communications since a silence mode commenced. The disclosed methods and devices may provide a user choice in how to control incoming communications of the mobile device.

16 Claims, 3 Drawing Sheets

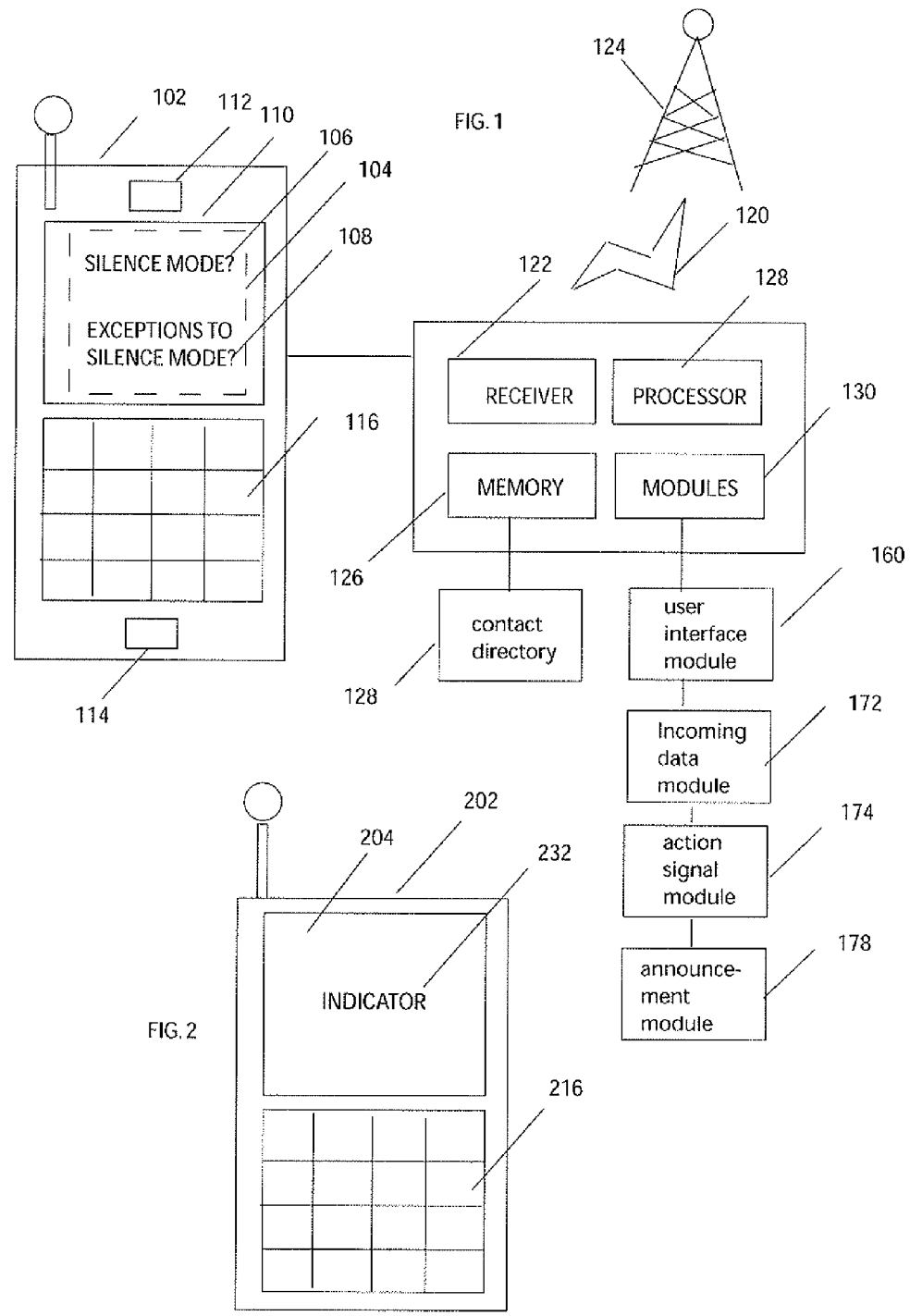

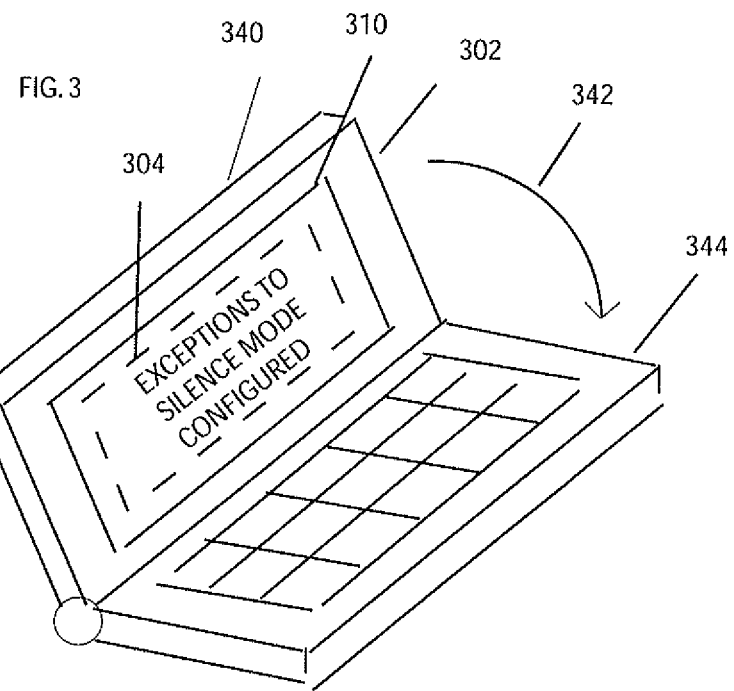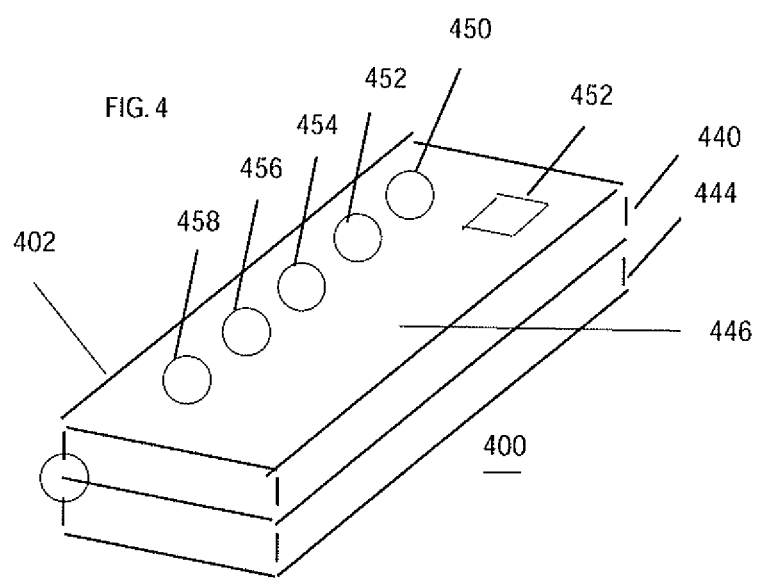

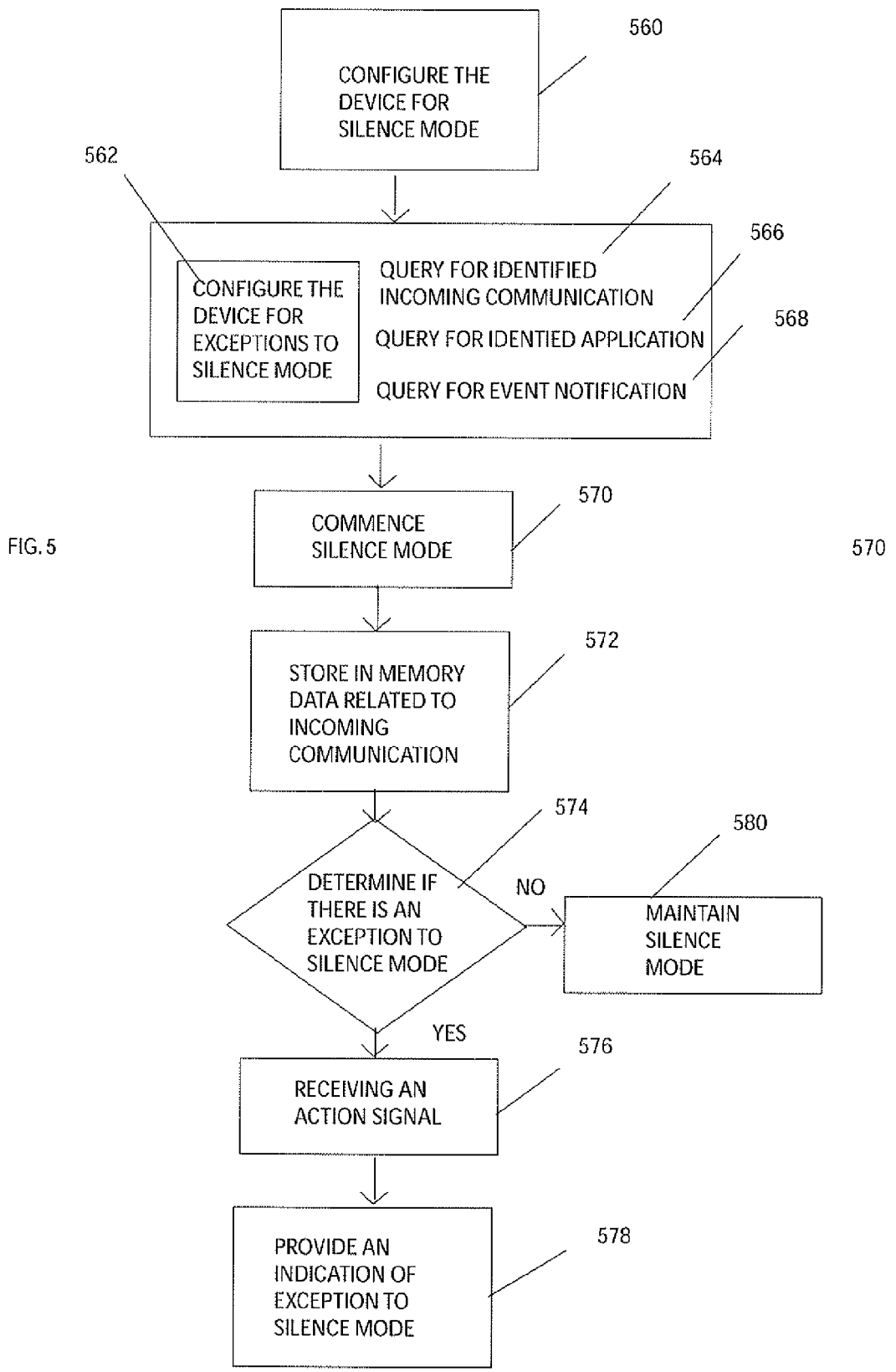

METHODS AND COMMUNICATION DEVICES CONFIGURABLE FOR SILENCE MODE AND EXCEPTIONS TO THE SILENCE MODE

FIELD

Disclosed are methods and communication devices configurable for silence mode and exceptions to the silence mode, and more particularly, for providing user control for indications of incoming communications.

BACKGROUND

Mobile communication devices are used for many different purposes including but not limited to voice communications, text messaging, Internet browsing, commerce such as banking, and social networking Mobile communication devices include memory that can store contact information, communication addresses and many applications. When a call comes in, the device will typically announce the incoming communication signal by a ring or vibration. The user can turn the device off, but then he/she may miss important notifications. When a device is in sleep, quiet or silence mode, incoming communications indications are not provided.

BRIEF DESCRIPTION OF THE DRAWINGS

FIG. 1 depicts an embodiment of a communication device including a user interface configured receive input to place the device in silence mode and to make exceptions to the silence mode;

FIG. 2 depicts an embodiment of a communication device including an indicator to provide an announcement that there is data stored related to incoming communications;

FIG. 3 depicts an embodiment of a communication device that has a folding form factor and a user interface of the display providing that the exceptions to the silence mode have been configured;

FIG. 4 depicts an embodiment of a communication device that has a folding form factor wherein the device, in a closed arrangement, can assume the silence mode when configured to do so; and FIG. 5 is an embodiment of a method of a communication device including configuring the device via a user interface to place the device in silence mode and to make exceptions to the silence mode.

DETAILED DESCRIPTION

Incoming mobile device notifications, calls, messages, and other updates can be very disruptive to the user. Alerts, ringtones, and even vibrations can be too intrusive in certain situations. For example, at an important business meeting when all attention must be on the meeting or during class where intrusions are unacceptable, a user must turn off the device to avoid disruptions. By turning the device off, the user may miss important notifications. In addition, the sender of the message may become frustrated because the user is not responding, and may continue to send messages or call, further disturbing the user. The user has little choice in how to control incoming communications of the mobile device.

Disclosed are methods and communication devices including a user interface configured receive input to place the device in silence mode and to make exceptions to the silence mode, a processor to provide an indication whether there is data stored related to incoming communications since a silence mode commenced, and an indicator to provide an announcement that there is data stored related to incoming communications. For example, were a user to wish to know when a particular contact has sent any type of communication to the user of the communication device, the user may configure the device to provide such an indication. On the other hand, were a user to wish to know, more specifically, when a particular contact has sent an email to the user of the communication device, the user may configure the device to provide such an indication.

The disclosed methods and communication device may further include a sensor to detect a user action with respect to the device so that the processor will provide an indication whether there is data stored related to incoming communications since a silence mode commenced. For example, a motion sensor can detect a gestural motion that can provide an indication whether there is data stored related to incoming communications upon a user's command while the device is in silence mode. In this way, the user can control when he/she wishes to be notified about incoming communications.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 depicts an embodiment of a communication device 102 including a user interface 104 configured receive input to place the device 102 in silence mode 106 and to make exceptions to the silence mode 108. The device 102 includes a display 110 which can annunciate the queries of the user interface 104. Of course the user interface can be audio via a speaker 112 and microphone 114 or any other suitable user interface. User input can be provided via a keyboard 116, a touch screen display 104, as an audio command via a microphone 114, or in any other suitable manner. Default settings may also be provided. It is understood that any manner in which to commence silence mode 106, and to provide exceptions 108 is within the scope of this discussion.

The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The device 102 further includes a receiver 122 to receive incoming communications 120, wirelessly or via a wired connection. The incoming communication 120 can include at least one of voice communications, voice mails, text messages, emails, SMS, pushed messages or social networking indications and any other type of incoming communication. For example, the communication device 102 can be a computer connected to the Internet, wirelessly or via wires, and an incoming message 120 can be an email.

As mentioned, the incoming communication 120 can be received from any suitable source, including a server 124. The server 124 is depicted as a remote server that may be within a wireless communication network. The network of course may be any type of wireless network including an ad hoc or wireless personal area network, a WiFi or wireless local area network, and a cellular or wireless wide area network. Likewise, the server 106 may be of any suitable configuration. The server 124 may be implemented as a single server or as a plurality of servers in communication in any arrangement. The operations of the server 124 may be distributed among different servers or devices that may communicate in any manner. It is understood that the depiction in FIG. 1 is for illustrative purposes.

The device 102 includes a memory 126 to store data related to the incoming communications 120 and a processor 128 to generate an action signal in accordance with an action signal module 174 to provide an indication in accordance with an announcement module 178 whether there is data stored in a memory 122 related to incoming communications 120 since a silence mode commenced. In other words, when an incoming communication 120 is received by the communication device 102, the exception 108 to the silence mode 106 will be announced by an indicator (see FIG. 2).

The exceptions 108 may relate to data stored in a contact directory 128 or any other data, such as an IP address. When a user is selecting one or more exceptions 108, the user interface can provide choices in any suitable manner. The exceptions to the silence mode can include at least one of receipt of an identified communication signal, an identified application indication or an identified event notification. With respect to the receipt of an identified communication signal, the user interface can provide a list to the user, or the user may enter data to identify an incoming message. In this way, when an incoming communication 120 that is an exception 108 is received by the device 120, the user can be notified of the incoming communication 120.

As mentioned, an exception can include an identified application indication or an identified event notification. For example, a calendar may be an application of the device 102. After silence mode has commenced, the device 102 may provide an indication relating to the calendar. An event may be an exception to the silence mode. For example, a low battery and/or a low signal strength may be an exception to the silence mode. It is understood that the exceptions to the silence mode may include any type of receipt of an identified communication signal, an identified application indication or an identified event notification.

The device can include modules 130 to provide the functionality of the device 102 described above. The modules 130 can carry out certain processes of the methods as described herein. The modules 130 can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

A user interface module 160 can be configured to receive input to place the device in silence mode and to make exceptions to the silence mode. An incoming communications module 172 can be configured for storing in a memory data related to the incoming communications. An action signal module 174 can be configured to process an action signal received so as to provide an indication that there is data stored related to incoming communications since a silence mode commenced. An announcement module 178 can be configured to provide an announcement by an indicator that there is data stored related to incoming communications when an action signal is received.

FIG. 2 depicts an embodiment of a communication device 202 including an indicator 232 to provide an announcement that there is data stored related to incoming communications 120 (see FIG. 1) when an action signal is received. As mentioned above, an action signal module 178 can be configured to process an action signal received so as to provide an indication 232 that there is data stored related to incoming communications 120 since a silence mode commenced.

The indication 232 can be in any suitable form. Since the device is in silence mode, the indication 232 may be a visual indication such as an announcement by at least one of one or more colors, particular timing characteristics, illumination density, numeric indicators, alpha indicators, icon indicators, indicia, images or patterns. The indicator 232 can be provided on a display 204 of the device 202, and/or by an indicator 232 that is distinct from the display 232 (see FIG. 4).

During the silence mode, the indicator 232 can provide, to the user, a sense of what is going on or the status or volume of messages or communications he or she is receiving, for example. In more detail, in a preferred embodiment, the indicator 232 with a "swarm" feature, as detailed herein, is particularly adapted to being able to monitor the volume of activity of one or more social networks, such as volume of communication activity the user has received or is receiving with respect to Twitter, My Space, Facebook, Linked In and the like. The indicator can provide less information or more information to the user. For example, the indicator 232 can provide to the user an indication as to which of the exceptions to the silence mode 108 (see FIG. 1) has been processed. It is also understood that the user can configure the type of indication to be provided in the case of any type of exception. Moreover, ambient conditions may be taken into account in the type of indication, automatically, or by user input. For example, in high ambient light conditions, a different visual indicator may be provided than in low ambient light conditions.

FIG. 3 depicts an embodiment of a communication device 302 that has a folding form factor and a user interface 304 of the display 310 providing that the exceptions to the silence mode have been configured. The folding form factor allows the top housing 340 to move in the direction of the arrow 342 to close over the lower housing 344.

FIG. 4 depicts an embodiment of a communication device 402 that has a folding form factor wherein the device 402, in a closed arrangement 400, can assume the silence mode when configured to do so. As should be understood, other form factors can be utilized. For example, a slider form factor similar to that shown in FIGS. 3 and 4, can be utilized, wherein one component such as back housing 444 can slide generally horizontally with respect to the other of housing 440. In the embodiment shown in the figures, the quiet mode can be invoked with the physical action of closing the device, initiated by the user, rather than by a button, switch or voice command. The back housing 444, for example, can have an exterior surface 446 which includes one or more indicators 450, 452, 454, 456 and/or 458 that may be configured to be visible by way of the exterior surface 446 of the housing 440. In this way, one or more indicators can be distinct from the display 310 (see FIG. 3).

Accordingly in a quiet or silence mode the user can chooses when he/she does not want to be disturbed. In a folding form factor such as a clam or book-like mobile device 402, (e.g. device with a hinge), the user can close the device 402 to automatically invoke the "quiet" mode. In this mode, the device is still on, but processes incoming updates/notifications in a non-disruptive way. For example, all incoming calls or messages can be automatically responded to with an "away" message. When a call comes in, the device can provide an outgoing message that might say "so-and-so is unavailable. Please leave a message and he will get back to you." When a message comes in, the device will automatically determine if there are any exceptions to the silence mode and if so, provide an indication of the incoming communication 120 (see FIG. 1).

As mentioned, one or more indicators 450, 452, 454, 456 and/or 458 that may be configured to be visible by way of the exterior surface 446 of the housing 440. It is understood that one or more indicators 450, 452, 454, 456 and/or 458 may be configured in any suitable manner. For example, the exterior housing 440 may include a design or motif that hides the indicators 450, 452, 454, 456 and/or 458 until they are activated. For example, the exterior housing 440 may be configured to have wood-like panels on its surface. Lights may "swarm" across the face of the device 402 when a new update occurs. A wood stripe or panel may correspond to one type of update: email, messages (text), calls/voicemail, and upcoming calendar events. If there are no updates in a stripe, no lights appear on that screen. The "swarm" can for example, move from right to left, as if coming from inside the device. Alternately, the swarm could go left to right and disappear inside the device. When the user opens the folding form factor device 402, the updates may be provided on the display 310 (see FIG. 3). When updates are not "swarming" to provide an indication, an analog clock may be displayed. It is understood that the indicators may be specific as mentioned here, somewhat specific or non-specific.

The one or more indicators of the exterior surface 446 or any other surface of the housing may be configured so that it does not look like a normal display, and therefore the device does not initially read as a phone or technology device. For example, the device 402 may include a sensor to determine the proximity of the user to the device 402. It may be determined that the user is far from the device. The one or more indicators can be configured to adapt to the situation so that a user may stay updated about new messages, news and other updates from any distance, such as "3-foot" distance. That is, the resolution of the updates may be variable. Were the device 402 to be buried in a purse or bag, low resolution may be required to see the indicators 450, 452, 454, 456 and/or 458 as the device 402 is in darkness. It is understood that any adaptive feature of one or more indicators is within the scope of this discussion.

In another embodiment, varying levels of indication can be provided depending upon, for example, urgency. In the case of emergency or urgent incoming messages, events or notifications, the indications may provide such information. For example, in hidden or stealth indicators, urgent indicators may appear as though from inside of the device 402 they are projecting themselves through the device in order to be seen. The indicators allow the user to see updates and have minimal interaction with the displayed content (i.e. quick messaging). The user may be triggered to open the device 402 and dig into a richer experience when the indicators 450, 452, 454, 456 and/or 458 provide information for such motivation.

As discussed above, one or more indicators can be configured in any suitable manner. They may also be silent or invisible until a user activates them. For example, the device 402 can include a sensor to 452 detect a user action with respect to the device 402 to provide to the processor 128 (see FIG. 1) a sensor signal to generate an action signal to provide an indication whether there is data stored related to incoming communications since a silence mode commenced. In this way, an action such as a wave of the user's hand can activate one or more indicators. In another embodiment, a verbal command can be sensed by the microphone 114 to activate one or more indicators. While the indicators discussed herein are visual, an audio or other form of indicator can be provided as well. Such an audio indicator may be beneficial for visually impaired users. Even with an audio indicator, in an embodiment where the action of the user may activate one or more indicators, the indicators are utilized when the user wishes them to be activated. Accordingly, the non-disruptive manner in which to notify the user of the exceptions is provided.

FIG. 5 is an embodiment of a method of a communication device 102 (see FIG. 1) including configuring 560 the device 102 via a user interface 104 to place the device 102 in silence mode and to make exceptions 562 to the silence mode. Such can be in accordance with a user interface module 160 configured to receive input to place the device in silence mode and to make exceptions to the silence mode. In making exceptions to the silence mode 562, queries can be presented for identified incoming communication, such as in accordance with the contact directory 128 or input from another source. Additional queries can include exceptions for identified applications 566 and for event notification 568.

The depicted method can include commencing silence mode 570 in any suitable manner, including as described above. As incoming communication 120 (see FIG. 1) is received, an incoming communication is stored in accordance with an incoming communication module 572 configured to store in a memory data related to the incoming communications. If it is determined 574 that there is an exception to the silence mode an action signal can be received by the processor 128. Such may be in accordance with an action signal module 174 configured to process an action signal received so as to provide an indication that there is data stored related to incoming communications since a silence mode commenced. The method further includes providing an indication 578 by an indicator such as indicator 232 and/or one or more indicators 450, 452, 454, 456 and/or 458 when there is an exception to the silence mode. Such may be in accordance with an announcement module 178 configured to provide an announcement by an indicator that there is data stored related to incoming communications when an action signal is received. If it is not determined that there is an exception to the silence mode, silence mode is maintained 580.

The disclosed are methods and communication devices include a user interface configured receive input to place the device in silence mode and to make exceptions to the silence mode and an indicator to provide an announcement that there is data stored related to incoming communications. In this way, the disclosed methods and devices may provide a user choice in how to control incoming communications of the mobile device. Accordingly, even when the device is in silence mode, the user may not miss important notifications.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A communication device, comprising:
a user interface configured receive input to place the device in silence mode and to make exceptions to the silence mode;
a receiver to receive incoming communications;
a memory to store data related to the incoming communications;
a processor to generate an action signal to provide an indication whether there is data stored related to incoming communications since a silence mode commenced;
a plurality of indicators to provide an announcement that there is data stored related to a plurality of incoming communications when an action signal is received, wherein the incoming communications include at least one of receipt of an identified application indication or an identified event notification.

2. The device of claim 1 wherein the plurality of incoming communications include two or more of voice communications, voice mails, text messages, emails, SMS, pushed messages and social networking indications.

3. The device of claim 1 further comprising:
a sensor to detect a user action with respect to the device to provide to the processor a sensor signal to generate an action signal to provide an indication whether there is data stored related to incoming communications since a silence mode commenced.

4. The device of claim 1 wherein the plurality of indicators include an announcement by at least one of one or more colors, particular timing characteristics, illumination density, numeric indicators, alpha indicators, icon indicators, indicia, images or patterns.

5. The device of claim 1 further comprising:
a housing having an exterior surface wherein the plurality of indicators are configured to be visible by way of the exterior surface of the housing.

6. The device of claim 1 further comprising:
a main display distinct from the indicator.

7. The device of claim 1 wherein the identified application is a calendar.

8. The device of claim 1 wherein the identified event is at least one of a low battery and a low signal strength.

9. The device of claim 1 wherein the indicator is based on ambient light conditions of the communication device.

10. A method of a communication device, comprising:
configuring the device via a user interface to place the device in silence mode and to make exceptions to the silence mode;
receiving incoming communications;
storing in a memory data related to the incoming communications;
generating an action signal to provide an indication whether there is data stored related to incoming communications since a silence mode commenced;
providing an announcement by a plurality of indicators that there is data stored related to a plurality of incoming communications when an action signal is received, wherein the incoming communications include at least one of receipt of an identified application indication or an identified event notification.

11. The method of claim 10 wherein
the plurality of incoming communications include two or more of voice communications, voice mails, text messages, emails, SMS, pushed messages and social networking indications.

12. The method of claim 10 wherein the plurality of indicators include an announcement, the method further comprising:
providing an announcement via the plurality of indicators by generating at least one of one or more colors, particular timing characteristics, illumination density, numeric indicators, alpha indicators, icon indicators, indicia, images or patterns for each of the plurality of indicators.

13. A communication device, comprising:
a user interface module configured to receive input to place the device in silence mode and to make exceptions to the silence mode;
a receiver for receiving incoming communications;
an incoming communications module configured to store in a memory data related to the incoming communications;
an action signal module configured to process an action signal received so as to provide an indication that there is data stored related to incoming communications since a silence mode commenced;
an announcement module to configured to provide an announcement by a plurality of indicators that there is data stored related to a plurality of incoming communications when an action signal is received, wherein the incoming communications include at least one of receipt of an identified application indication or an identified event notification.

14. The device of claim 13 wherein the plurality of incoming communications include two or more of voice communications, voice mails, text messages, emails, SMS, pushed messages and social networking indications.

15. The device of claim 14 further comprising:
a sensor to detect a user action with respect to the device to provide to the processor a sensor signal to generate an action signal to provide an indication whether there is data stored related to incoming communications since a silence mode commenced.

16. The device of claim 13 wherein the plurality of indicators include an announcement by at least one of one or more colors, particular timing characteristics, illumination density, numeric indicators, alpha indicators, icon indicators, indicia, images or patterns.

* * * * *